Figure 1:
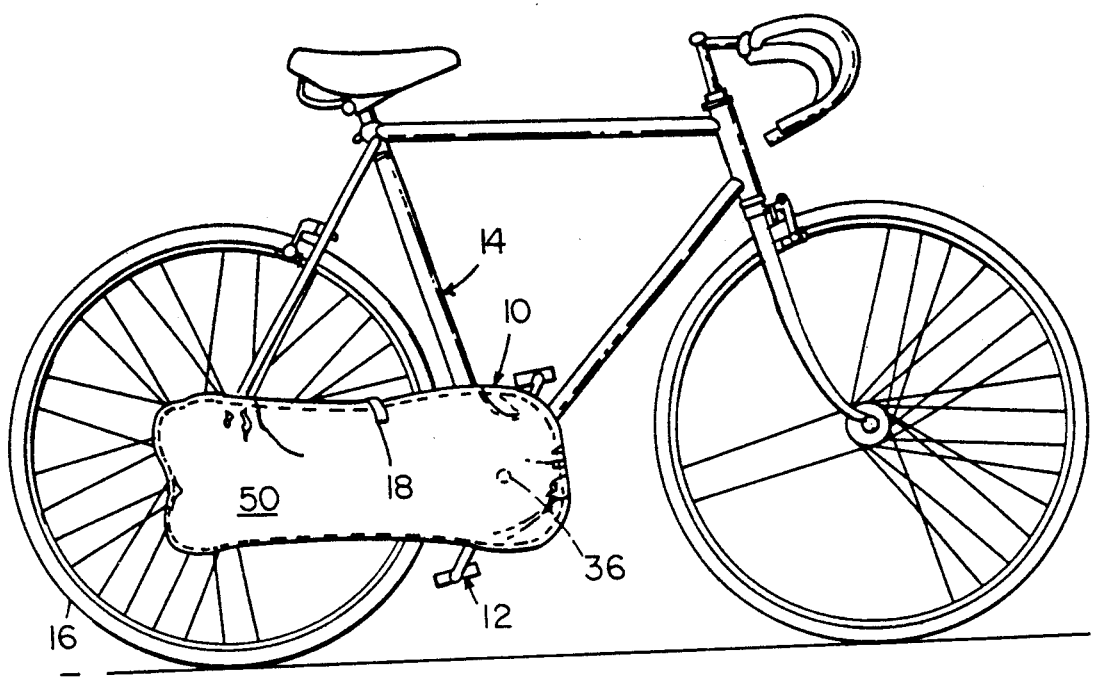

United States Patent [19]

Anglin et al.

[11] Patent Number: 5,018,564
[45] Date of Patent: May 28, 1991

[54] FABRIC PROTECTIVE COVER FOR A DRIVE MECHANISM OF A BICYCLE

[76] Inventors: Gregory V. Anglin, 10210 East F, Tacoma, Wash. 98445; Robert W. Richmond, 2916 S. 200th St. Space 42, Sea-Tac, Wash. 98198

[21] Appl. No.: 499,190

[22] Filed: Mar. 26, 1990

[51] Int. Cl.$^5$ .................... B62J 13/04; B65D 65/08
[52] U.S. Cl. ............................ 150/167; 474/146
[58] Field of Search .............. 150/166, 167, 154; 206/335; 474/146; 280/152.2, 160.1

[56] References Cited

U.S. PATENT DOCUMENTS

| | | | |
|---|---|---|---|
| 531,254 | 12/1894 | Biddles | 474/146 X |
| 594,694 | 11/1897 | Humphrey | 474/146 |
| 732,536 | 6/1903 | Fisher | 474/146 |
| 1,279,244 | 9/1918 | Brugman . | |
| 1,574,898 | 3/1926 | Johnston | 150/166 X |
| 3,309,954 | 3/1967 | Phillips et al. | 150/154 X |
| 3,557,298 | 1/1971 | Thompson et al. | 150/154 X |
| 3,850,141 | 11/1974 | Schmitt | 150/154 X |
| 3,927,578 | 12/1975 | Mattila | 474/146 X |
| 3,968,913 | 7/1976 | Weed et al. | 150/167 X |
| 4,142,565 | 3/1979 | Plunkett, Sr. | 150/154 |
| 4,282,279 | 8/1981 | Strickland | 215/12.1 X |
| 4,378,883 | 4/1983 | Profeta | 150/167 X |
| 4,632,416 | 12/1986 | Zelenetz | 280/152.2 X |

FOREIGN PATENT DOCUMENTS

| | | | |
|---|---|---|---|
| 27601 | of 1897 | United Kingdom | 474/146 |
| 11173 | of 1898 | United Kingdom | 474/146 |
| 24651 | of 1902 | United Kingdom | 474/146 |

Primary Examiner—Sue A. Weaver
Attorney, Agent, or Firm—Roy E. Mattern, Jr.

[57] ABSTRACT

A fabric is cut, sewn, and furnished with Velcro or other hook and loop fastener portions to become a cover to be removably positioned about a drive mechanism of a bicycle to protect this drive mechanism from the accumulation of dirt. A back elevational side of this fabric cover has spaced circular cuts with access cuts to these spaced circular cuts, thereby forming an access flap. These cuts accommodate the fitting of this back elevational side about both the rear axle and the pedal axle, and alongside the drive chain and the sprocket of a bicycle. After the fitting of this back elevational side about a rear axle and a pedal axle, Velcro fastener portions are used to keep the access cuts closed together when this cover is in use. A front side, which is continuous throughout, is thereafter secured to the back elevational side, where not previously initially sewn together to make this cover, by using components of Velcro fasteners. Preferably a Velcro strap is used to keep a rear bicycle wheel from rotating, as this Velcro strap of this cover is passed around a spoke of a bicycle wheel.

3 Claims, 2 Drawing Sheets

FIG.3
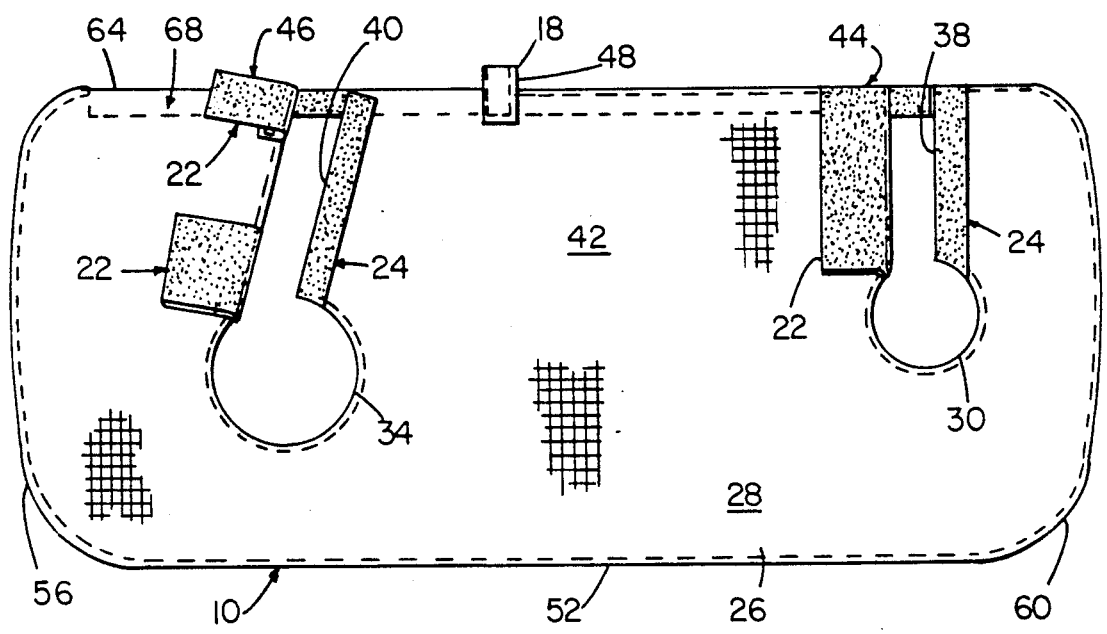
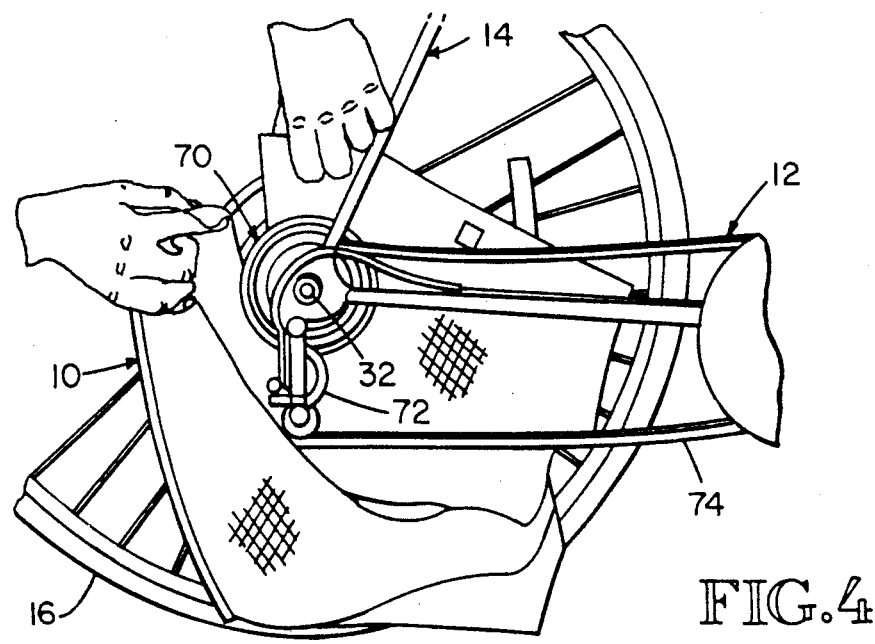
FIG.4

1

FABRIC PROTECTIVE COVER FOR A DRIVE MECHANISM OF A BICYCLE

BACKGROUND

There has always been a need to try to keep the drive mechanisms of bicycles clean to prevent unnecessary wear otherwise caused by dirt that accumulates in these drive mechanisms. In 1894 Walter Biddles in his U.S. Pat. No. 531,254 illustrated and described his gear case which was essentially all metal and permanently mounted on a bicycle frame to cover the bicycle drive mechanisms. Then in 1897 William C. Humphrey in his U.S. Pat. No. 594,694 disclosed his dress and mud guard which also was essentially all metal and permanently mounted on a bicycle frame to the bicycle drive mechanism.

In 1976 Messrs. Weed and Mougel, in their U.S. Pat. No. 3,968,913, illustrated and described their protective fabric cover for an automobile mounted bicycle carrier. Their fabric cover completely covered the entire bicycle. Openings provided in the flexible fabric material of the cover cleared portions of the automobile bicycle carrier and also strap portions used to secure the bicycle to this carrier. This fabric cover had a top opening to receive the bicycle. A top flap secured subsequently by a Velcro fastener completed the protection of the entire bicycle from the ambient environment.

Later, in 1983, Joseph G. Profeta in his U.S. Pat. No. 4,378,883, disclosed his bicycle carrying case made of vacuum formed plastic resin material, originally available in sheets. Two complete formed sides were hinged together to completely cover a bicycle. Fasteners were used to keep the cover sides together. Openings were provided to receive hangers either mounted on vehicles or on dwellings, and to receive a person's hands, or shoulder straps. The interior of this complete case was padded. Another embodiment was made as a unitary overall member having an integral hinge between the sides.

These past permanent covers, for covering only the drive mechanism of bicycles, and the full covers of bicycles are recognized as serving their respective purposes very well. There remains a need, however, for a low cost, easily made, easily installed, easily removed, and readily cleaned, fabric cover to place over the drive mechanism of bicycles, when they are being transported on a vehicle or stored while awaiting the next bicycle trip, to keep the drive mechanism clean.

SUMMARY

The drive mechanism of a bicycle is conveniently protected from the accumulation of dirt during transport and/or storage of a bicycle, by using a fabric cut, sewn, and furnished with Velcro or other hook and loop fastener portions, to be conveniently installed and conveniently removed, using the hook and loop fastener portions. This fabric cover is readily cleaned and compactly stored when not in use.

The fabric cover is installed by first positioning the back elevational side thereof inside the gears, derailleur, chain, and sprocket, and about both the rear axle and pedal axle, utilizing a flap portion formed by vertical cuts, and circular cuts, made in this back elevational side. Then the cuts are secured by using respective hook and loop fastening portions. Thereafter, a front elevational continuous side is placed over the gears, derailleur, chain and sprocket and secured to the back elevational side by respective hook and loop fastening portions, to thereby complete the protective covering of a drive mechanism of a bicycle.

DRAWINGS

Figure 2:
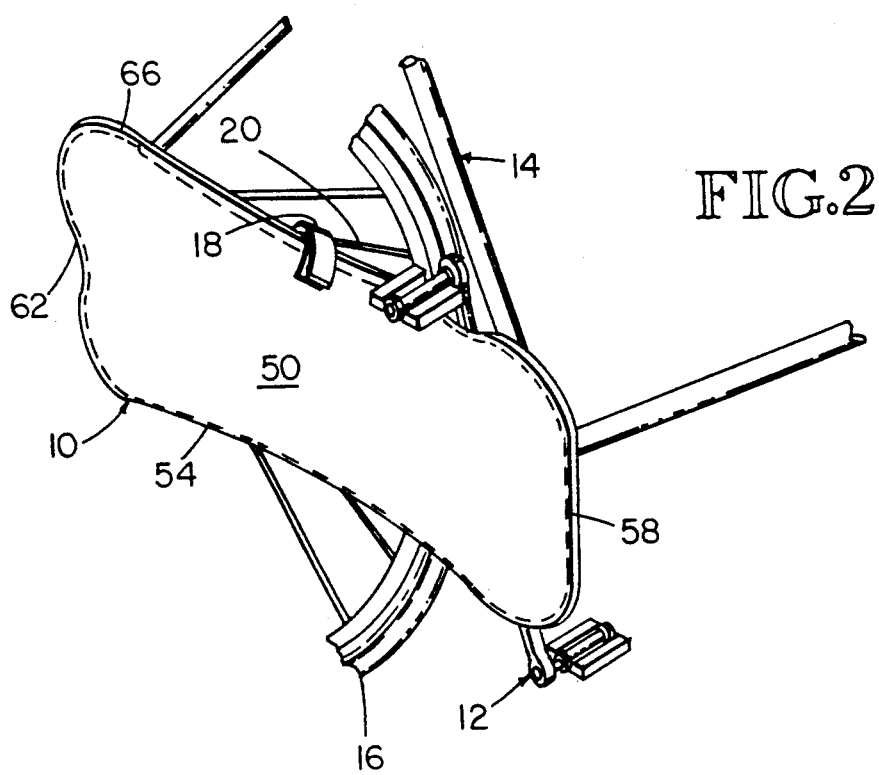

This fabric protective cover for a drive mechanism of a bicycle, in respect to a preferred embodiment, is illustrated in the drawing, wherein:

FIG. 1 is a side elevational view of a bicycle having the drive mechanism thereof protectively covered by this fabric cover;

FIG. 2 is a partial perspective view of portions of a bicycle and the full protective cover indicating how a strip of fabric, covered with a respective portion of a hook and loop fastener, is sewn at one end to the cover, then looped about a spoke of a bicycle wheel, and then the otherwise free end is secured by a portion of a hook and loop fastener to the cover, to thereby keep the bicycle wheel from rotating relative to the bicycle frame.

FIG. 3, is a side elevation view of the exterior of the back elevational side of this fabric protective cover placed in position alongside the front elevational continuous side, indicating the circular cutouts for the rear axle, and pedal axle, and the vertical cuts for access to these circular cutouts, and also showing the hook and loop fastening portions used in securing the vertical cuts, the top edges of back and front elevational sides, and the spoke holding loop; and FIG. 4 is a partial side elevational view of portions of a bicycle and the full fabric protective cover after the initial placement thereof, in part, behind the gears, derailleur, and chain, indicating the start of the convenient installation of this protective cover for the drive mechanism of a bicycle.

DESCRIPTION

The conveniently installed and removed fabric protective cover 10 for the drive mechanism 12 of a bicycle 14, illustrated in a preferred embodiment in all the FIGS. 1 through 4 of the drawings, when installed, keeps the drive mechanism 12 of a bicycle 14 free of dirt during the transport or storage periods of the bicycle 14. In FIG. 1, this fabric protective cover 10 is shown installed around the drive mechanism 12 of a bicycle 14. Preferably when installed, the rear bicycle wheel 16 is kept from rotating by placement of the loop 18 of this cover 10 about a spoke 20 of the wheel 16, as illustrated in FIG. 2.

This fabric protective cover 10 is shown in FIG. 3 as it is arranged for storage when not in use, with the exception of showing the final securing of some of the hook and loop fastener interfitted portions 22, 24. The exterior 26 of the back elevational side 28 of this cover 10 is illustrated to show the circular opening 30 which is fitted about the rear axle 32 of the bicycle; the circular opening 34 which is fitted about the pedal axle 36 of the bicycle 14, the respective access vertical cutouts 38, 40, providing access to the circular openings 30, 34, and in so doing creating the access flap portion 42 of this back elevational side 28 of the cover 10.

The cutout 38 for reaching the circular opening 30 is securely covered and closed by using the overall Velcro or other hook and loop fastener 44, having the respective interfitting portions 22, 24 of a Velcro fastener. The cutout 40 for reaching the circular opening 34 is securely covered and closed by using the overall Velcro fastener 46, having the respective interfitting portions 22, 24, of a Velcro fastener. These overall Velcro fasteners 44, 46 are shown in their opened positions in FIG. 3.

The loop 18, which is utilized to be passed around a spoke 20 of a rear bicycle wheel 16 and secured to this fabric protective cover 10, is equipped with an overall Velcro or other hook and loop fastener 48 having respective interfitting portions 22, 24. This loop 18 is secured at one end at all times to the access flap portion 42 of this back elevational side 28 of this cover 10, as particularly shown in FIGS. 3 and 4. When this loop 18 is secured about the spoke 20 of the rear bicycle wheel 16, this wheel 16 will not be able to turn around in many rotations, when the wind is blowing, as a vehicle carrying the bicycle on a bicycle rack is underway. If no loop 18 is available or the loop 18 is not secured, then the rotating wheel 16 is often able to partially dislodge this full fabric protective cover 10.

The continuous front elevational side 50 and the back elevational side 28 of this fabric protective cover 10, are preferably, sewn together along their common bottom edges 52, 54, along their common front edges 56, 58, and along their common back edges 60, 62, as particularly shown in FIGS. 3 and 4. Then their oppositely positioned top edges 64, 66 are closed together by an overall Velcro or other hook and loop fastener 68 having the respective interfitting portions 22, 24, as shown in FIG. 3.

The start of the placement of this removable fabric protective cover 10 about the drive mechanism 12 of a bicycle 14 is illustrated in FIG. 4. All of the overall Velcro or other hook and loop fasteners 44, 46, 48, and 68, are in their open positions of their respective interfitting portions 22, 24. The back elevational side 28 is being placed behind the gear assembly 70, derailleur 72, chain 74. Then by utilizing the circular opening 30 for the rear axle 32 and the cutout 38 for reaching this opening 30, portions of this cover 10 are placed about the rear axle 32.

Subsequently, but not shown, this placement is continued by utilizing the circular opening 34 for the pedal axle 36 and the cutout 40 for reaching this opening 34 to place portions of this cover 10 about the pedal axle 36. These placements, in reference to the circular openings 30, 34, and rear axle 32 and pedal axle 36 are completed by the respective closings of the respective overall hook and loop fasteners 44, 46, which respectively close the cutouts 38 and 40.

Then the overall hook and loop fastener 68 is utilized to join the oppositely positioned top edges 64, 68 of the back elevational side 28 and the continuous front elevational side 50 to complete the closure of this full fabric protective cover 10 about the drive mechanism 12 of the bicycle 14. Preferably, the final step is undertaken to place the loop 18 about a spoke 20 of the rear wheel 16 of this bicycle 14, to keep this wheel 16 from rotating relative to this fabric protective cover 10, when it is in its protective covering position preventing the accumulation of dirt on the drive mechanism 12, when the bicycle 14 is being transported or stored.

We claim:

1. A full fabric material cover for the drive mechanism of a bicycle to protect the drive mechanism from dirt during storage of a bicycle or during transport of a bicycle, such as when a bicycle is carried on a bicycle rack in turn mounted on a vehicle, having the integral arrangement of such cover, comprising:
    a) a back elevational side of this cover having a lower edge, an essentially fully openable top edge, a front edge, and a back edge; a rear opening to fit about a rear axle of a bicycle, inside of rear gears and a drive chain; a front opening to fit about a pedal axle, inside of a right side pedal, sprocket, and drive chain; a vertical cut extending through and from the top edge of this back elevational side down to this rear opening; an essentially vertical cut extending through and from the top edge of this back elevational side down to this front opening; a flap thereby formed by these respective vertical cuts, which commences in the fabric material that extends between the rear opening and front opening and extends up to the essentially fully openable top edge of this back elevational side;
    b) a front elevational side of this cover, having a lower edge, an essentially fully openable top edge, a front edge, and a back edge, and arranged to be continuous throughout, extending longitudinally from a rear axle location of a bicycle to the sprocket end location, and extending vertically from the lower edge to the essentially fully openable top edge; and having both the back edge and the front edge and the lower edge respectively commonly formed with the back edge and front edge and the lower edge of the back elevational side of this cover;
    c) respective joinable hook and loop fastener portions secured to respective sides of the vertical cut of the back elevational side, which provides access to reach a rear axle of a bicycle:
    d) respective joinable hook and loop fastener portions secured to respective sides of the essentially vertical cut, which provides access to reach a pedal axle of a bicycle; and
    e) respective joinable hook and loop fastener portions secured to a respective side of the essentially fully openable top edge portions of both the front elevational side, and the back elevational side, the latter including open top edge portions, which are on the flap formed in the back elevational side.

2. A full fabric material cover for the drive mechanism of a bicycle, as claimed in claim 1, having a means adapted to hold a rear wheel of a bicycle in a non-rotative position relative to this fabric material cover, when this cover is being used to protect the drive mechanism, from the otherwise accumulation of dirt.

3. A full fabric material cover for drive mechanism of a bicycle, as claimed in claim 1, having a hook and loop fastener to be placed about a spoke of a rear wheel of a bicycle, to hold a rear wheel of a bicycle in a non-rotative position relative to this fabric material cover when this cover is being used to protect the drive mechanism, from the otherwise accumulation of dirt.

* * * * *